Oct. 7, 1924.

C. A. BORNMANN, JR 1,511,159

WINDING KEY FOR CAMERAS

Filed April 5, 1924

INVENTOR
CARL A. BORNMANN JR.
BY
Philip S. Hopkins
ATTORNEY

Patented Oct. 7, 1924.

1,511,159

UNITED STATES PATENT OFFICE.

CARL A. BORNMANN, JR., OF BINGHAMTON, NEW YORK, ASSIGNOR TO ANSCO PHOTO-PRODUCTS, INC., OF BINGHAMTON, NEW YORK.

WINDING KEY FOR CAMERAS.

Application filed April 5, 1924. Serial No. 704,521.

*To all whom it may concern:*

Be it known that I, CARL A. BORNMANN, Jr., a citizen of the United States, and a resident of the city of Binghamton, county of Broome, and State of New York, have invented a new and useful Improvement in a Winding Key for Cameras, of which the following is a description, reference being had to the accompanying drawing, which forms a part of this application.

My invention relates to cameras and particularly to a novel type of winding key for the same.

The principal object of my invention is to provide such a key of the lock type which is positive in operation, simple in construction and of few parts rendering the same inexpensive in manufacture.

More specifically it is my object to utilize an expanding washer of a character which will permit ready turning of the stem in one direction but which effectually locks the same against rotation in the opposite direction.

Other objects and advantages in details of construction and operation will be apparent as the description proceeds, reference being had to the accompanying drawing where like reference numerals indicate like parts.

In the drawing:—

Figure 1:
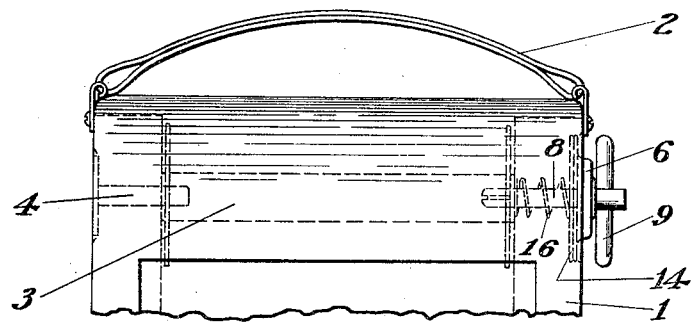
Figure 1 is a front view of the top portion of a camera showing my improved winding key in position and ready for operation.

Reference numeral 1 indicates a camera of conventional type, in this case a folding camera to which my improved key may be applied. It will be understood, however, that this key is equally adaptable for use on cameras of the box type as well. Number 2 indicates the usual carrying handle on the camera and 3 refers to a film spool supported in the camera by the pin journal 4 and the key web 5. These parts are all of conventional design and require no detailed explanation.

My improved key comprises a cup shaped housing 6 provided centrally thereof with an opening 7 thru which the stem 8 of the key projects. A finger piece 9 is adapted to engage in the opening 10 near the end of the stem 8 whereby the same may be rotated. Fitting in the cup shaped housing 6 is a thin washer 11 and a locking washer consisting of the two semi-circular pieces 12 and 13. A cover plate 14 is provided to retain these washers in place within the housing 6 and is provided centrally, as is the washer 11, with a circular opening permitting the stem 8 to extend therethru. Matched openings 15 are also provided in the housing 6 and cover plate 14 whereby the key may be secured to the wall of the camera by screws, rivets or other suitable means. The coil spring 16 encircles the stem 8 between the cover plate 14 and a washer 17 lying against the web 5 of the stem. This spring acts to normally force the stem inwardly whereby the web 5 may engage in the usual slot in the end of the spool 3. It will be readily understood, however, that the stem 8 may be withdrawn against the action of the spring 16 permitting ready removal of such spool from the camera.

Figure 2:
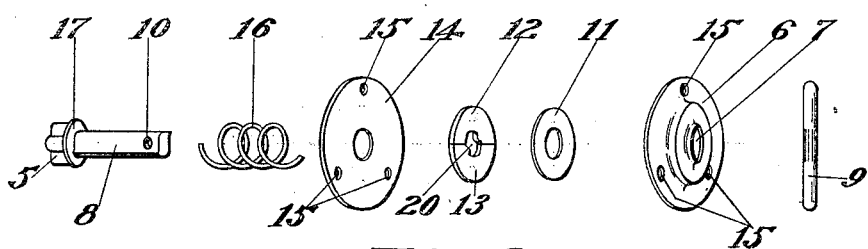
Figure 2 is an exploded view showing clearly in perspective the various parts or elements which go to make up the key.
Figure 3:
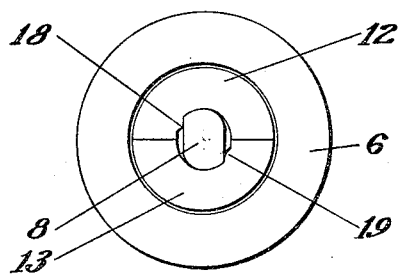
Figure 3 is an enlarged detail showing the stem and lock washer in one position in the key cup.
Figure 4:
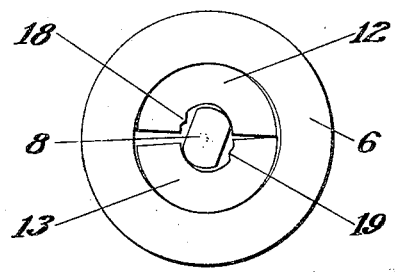
Figure 4 shows the same parts in locking position.
Figure 5:
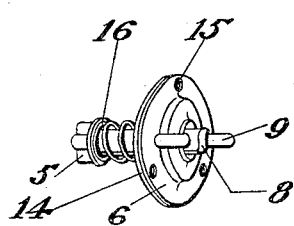
Figure 5 is a perspective of the assembled key.

The parts 12 and 13 making up the lock washer are recessed on their inner edges as shown clearly in Figs. 2, 3 and 4. These recesses are semi-circular in shape except adjacent one end thereof, which is cut to form shoulders 18 and 19. When this washer is assembled the shoulders 18 and 19 lie diametrically opposite from each other across the opening 20 thru which the stem 8 passes. The stem itself is cam shaped in cross section and presents straight edges which fit against the shoulders 18 and 19 of the washer.

From the foregoing description and from the disclosures in Figs. 3 and 4 it will be understood that upon rotation of the stem 8 to the left in Fig. 3 the engagement of the straight edges of said stem with the shoulders 18 and 19 will result in rotation of the washer parts 12 and 13. If, however, it is attempted to turn the stem in the opposite direction, the spreading action clearly illustrated in Fig. 4 takes place forcing the washer parts away from the center and binding them against the wall of the housing 6 thus effectually locking said stem against rotation in that direction.

It will be obvious from this description that I have devised a winding key for cameras which consists of few parts, is simple and easy of operation and assembly and which is decidedly practical and effective for the purpose described. Of course my invention is susceptible to many variations in design and construction without departing from the scope and spirit thereof. I do not limit myself therefore to the exact form shown other than by the appended claims.

I claim:

1. A winding key for cameras comprising a housing, a stem passing thru said housing and provided with integral and oppositely directed shoulders, and a two piece washer within said housing completely encircling and cooperating with said stem.

2. A winding key for cameras comprising a housing, a cam shaped stem passing thru said housing and cooperating with a two piece washer completely encircling the same therein.

3. A winding key for cameras comprising a housing, a stem, a two piece washer in said housing having a central aperture therethru having completely encircled said stem, shoulders on said two piece washer projecting into said aperture and cooperating with said stem whereby the same may be turned freely in one direction and locked against rotation in the opposite direction.

4. A winding key for cameras comprising a housing and a stem provided with rounded sides and straight sides, a two piece washer within said housing apertured at its center, and shoulders on said washer extending into said aperture and cooperating with the straight sides of said stem whereby the same may be rotated in one direction.

CARL A. BORNMANN, Jr.